Henry Gerner's
Improvement in Steam Boilers.

4186

REISSUED NOV 29 1870

Witnesses.
J. R. Turner
G. Gott.

Inventor.
Henry Gerner
By J. P. Hitch his atty.

United States Patent Office.

AMERICAN GERNER BOILER COMPANY, OF NEW YORK, N. Y., ASSIGNEES OF HENRY GERNER.

Letters Patent No. 73,595, dated January 21, 1868; reissue No. 4,186, dated November 29, 1870.

DIVISION B.

IMPROVEMENT IN STEAM-GENERATORS.

The Schedule referred to in these Letters Patent and making part of the same.

*To all whom it may concern:*

Be it known that HENRY GERNER, of the city of New York, county and State of New York, has invented certain new and useful Improvements in Steam-Boilers, of which the following is a specification, reference being had to the accompanying drawing forming part thereof.

Similar letters indicate corresponding parts.

Figure 1:
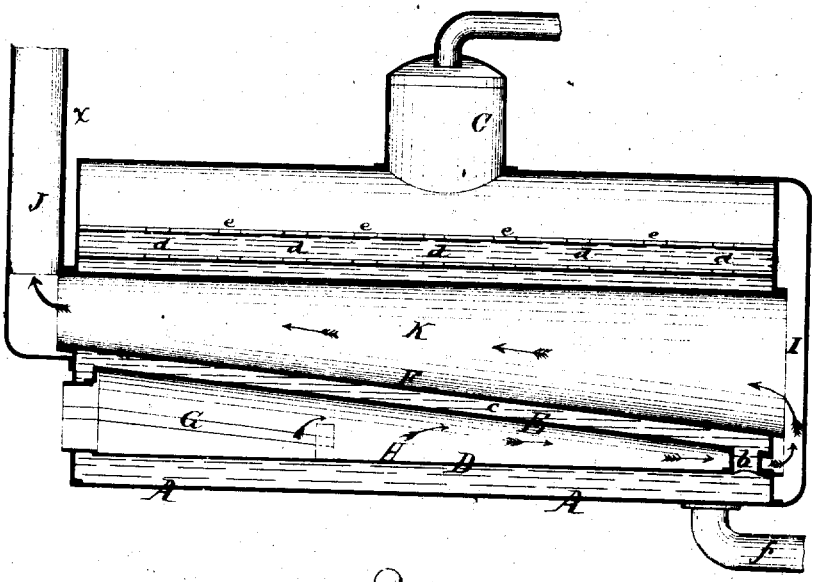
Figure 1 represents a longitudinal central section thereof.
Figure 2:
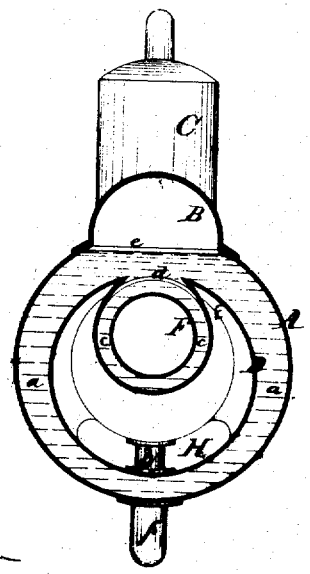
Figure 2 is a transverse section of the same, the line *x x*, fig. 1, indicating the plane of section and looking in the direction of the arrow opposite that line.

The invention relates to steam-boilers in which the products of combustion pass from the fire-place to the opposite end through a fire-flue or combustion-chamber within the boiler, and thence return to the front end through a separate flue, also within the boiler, and consists in combining within a boiler two fire-flues, one within the other, and each within a water-chamber, as represented in the drawing.

A represents a boiler-shell, the upper part of which may, if desired, be cut away, as shown in the drawing, and replaced by a semi-cylindrical drum, B, giving thereby additional steam room.

This drum may be provided with an additional steam-dome, C.

In the interior of the shell A is a second shell, D, the diameter of which is sufficiently smaller than that of the shell A to leave room for the water-chamber *a*.

The upper part of the inner shell D is cut away and replaced by the shell E, the upper portion of which is also cut away, the two shells being united at their cut edges, as shown in the drawing.

This shell E is secured in place within the shell D, so as to leave between its under surface and the inner surface of the lower portion of the shell D a suitable fire-flue or combustion-chamber, H, and its rear end is made to connect by one or more tubes, *b*, with the water-chamber *a*.

Within the shell E is placed and secured another shell, F, the diameter of which is such that an annular water-chamber, *c*, is left between it and the shell E.

The two shells E and F are represented in the drawing of a conical form, as being better than the cylindrical form, giving a more favorable heating action to the flame upon the walls of the flues, preventing the collection of sediment on the lower surface of the water-chamber *c*, and affording conveniently a larger space for the fire-place.

The interior of the shell F constitutes the return fire-flue.

The fire is made on the grate G, which is situated under the front end of the shell E, and the flames pass through the flue H to the jacket I, thence back through the flue F to the smoke-stack J.

Both the direct and return fire-flues H and F are each thus substantially enveloped by a water-chamber, exposing, when the boiler is in operation, a comparatively thin sheet of water to a large heating-surface, thereby generating steam with great economy of fuel and equally diffusing heat throughout the boiler.

What is claimed as new, and desired to be secured by Letters Patent, is—

A return longitudinal fire-flue, F, within a direct longitudinal fire-flue, H, each fire-flue being within a water-chamber, *a* and *c*, and all within the boiler, substantially as described.

HENRY GERNER,
By AMERICAN GERNER BOILER COMPANY,
By W. MARSH KASSON, *President.*

Witnesses:
FRAZIER K. WEED,
R. M. GILMOUR.